(12) United States Patent
Magata

(10) Patent No.: US 8,231,021 B2
(45) Date of Patent: Jul. 31, 2012

(54) STRIP-SHAPED HANDLE PART FOR DRINKING WATER BOTTLE

(75) Inventor: Shinichiro Magata, Iwata (JP)

(73) Assignee: Magata Fuji Chemical Co., Ltd. (JP)

( * ) Notice: Subject to any disclaimer, the term of this patent is extended or adjusted under 35 U.S.C. 154(b) by 453 days.

(21) Appl. No.: 12/531,709

(22) PCT Filed: Feb. 29, 2008

(86) PCT No.: PCT/JP2008/053601
§ 371 (c)(1),
(2), (4) Date: Sep. 17, 2009

(87) PCT Pub. No.: WO2008/146509
PCT Pub. Date: Dec. 4, 2008

(65) Prior Publication Data
US 2010/0032406 A1     Feb. 11, 2010

(30) Foreign Application Priority Data

Jun. 1, 2007  (JP) .................................. 2007-146351
Feb. 22, 2008 (JP) .................................. 2008-041730

(51) Int. Cl.
*B65D 23/10* (2006.01)
(52) U.S. Cl. .................... 215/396; 220/758; 220/759
(58) Field of Classification Search .......... 215/395–398; 220/758, 759
See application file for complete search history.

(56) References Cited

U.S. PATENT DOCUMENTS

| 4,094,449 | A | * | 6/1978 | Schlegel et al. ................ 222/475 |
| 4,379,578 | A | * | 4/1983 | Schuler ........................ 294/31.2 |
| 4,511,167 | A | * | 4/1985 | Kawaguchi ....................... 294/28 |
| 4,656,566 | A | * | 4/1987 | Kelley ........................... 362/202 |
| 4,727,997 | A | * | 3/1988 | Nakamura et al. ............. 215/398 |
| D337,241  | S | * | 7/1993 | Szekely .......................... D7/622 |
| 6,378,924 | B1 | * | 4/2002 | McCrumb ........................ 294/28 |
| 6,926,163 | B2 | * | 8/2005 | Darr et al. ..................... 215/396 |
| 7,431,169 | B2 | * | 10/2008 | Ishikawa et al. .............. 215/396 |
| 2011/0204017 | A1 | * | 8/2011 | O'Sullivan .................... 215/396 |

FOREIGN PATENT DOCUMENTS

| JP | 60-142729    | 9/1985  |
| JP | 63-97633     | 6/1988  |
| JP | 3-84738      | 8/1991  |
| JP | 5-51730      | 7/1993  |
| JP | 5-61038      | 8/1993  |
| JP | 08-318921    | 12/1996 |
| JP | 10-297635    | 11/1998 |
| JP | 2001-146237  | 5/2001  |
| JP | 2003-226315  | 8/2003  |
| JP | 2005-041513  | 2/2005  |

* cited by examiner

*Primary Examiner* — Tri Mai
(74) *Attorney, Agent, or Firm* — Bacon and Thomas, PLLC

(57) ABSTRACT

A strip-shaped handle part is formed with divided handle halves attached to opposite ends of a strip separate from a drinking water bottle, and then wound around and secured to the drinking water bottle, thereby reducing the proportion of defective bottles and extending the useful life of the handled drinking water bottle. In addition, material separation at the time of disposal of the handled drinking water bottle for recycle is facilitated. Further, when a cushion material which doubles as a slip stopper is provided on the surface of the strip-shaped handle part which contacts the drinking water bottle, looseness between the attached handle and the drinking water bottle and displacement of the handle is prevented and the durability of the handled drinking water bottle is improved.

12 Claims, 6 Drawing Sheets

FIG. 1
FIG. 2
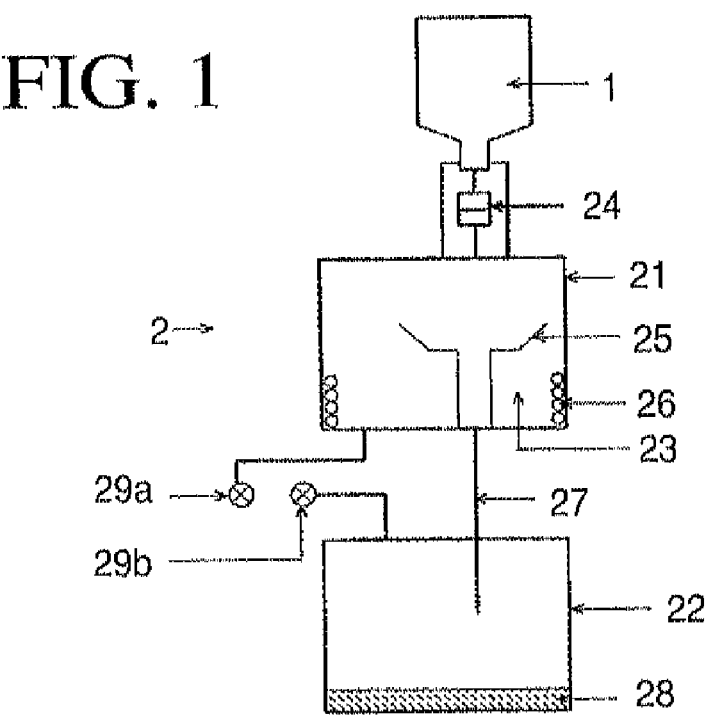
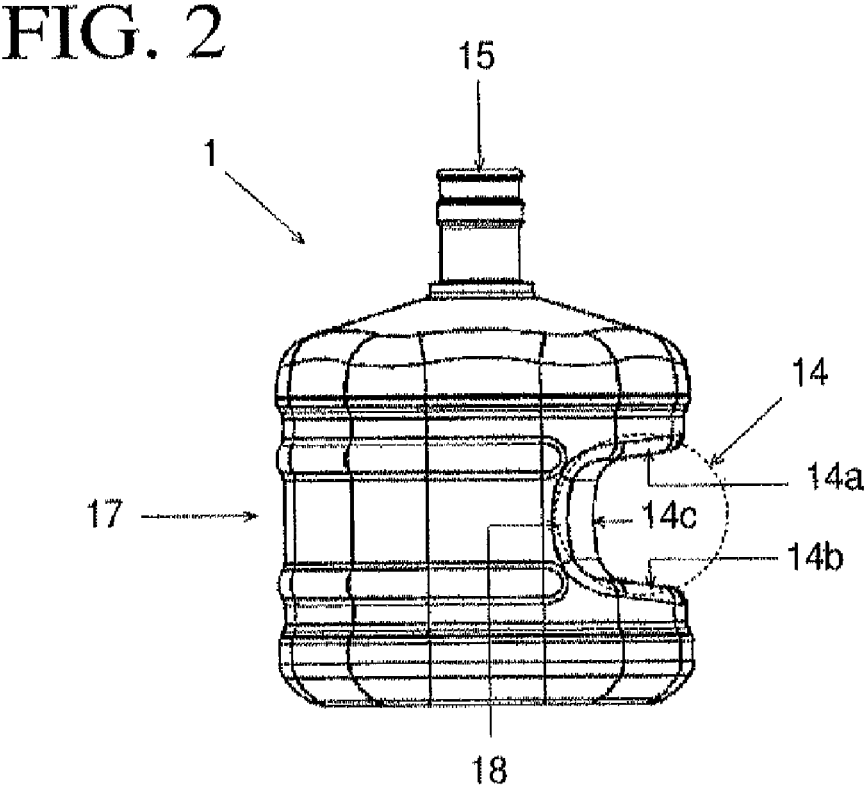

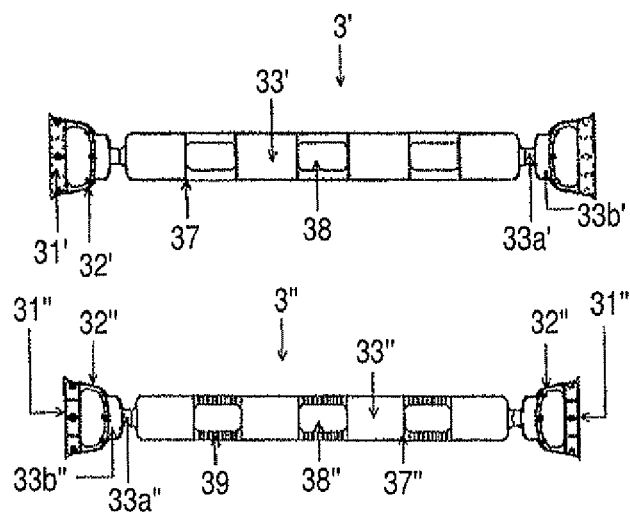
FIG. 6
FIG. 7
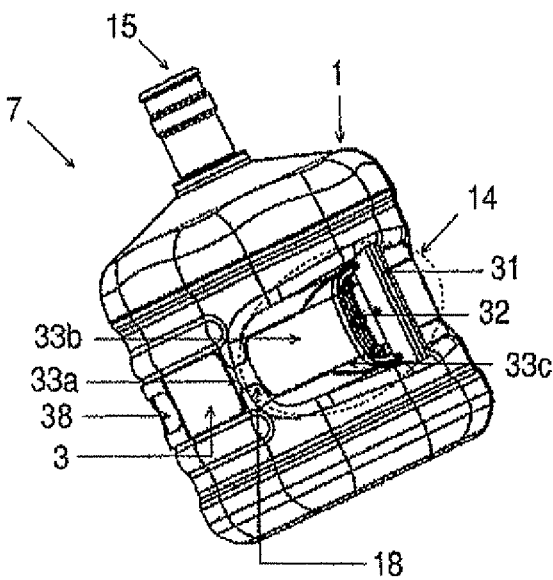
FIG. 8
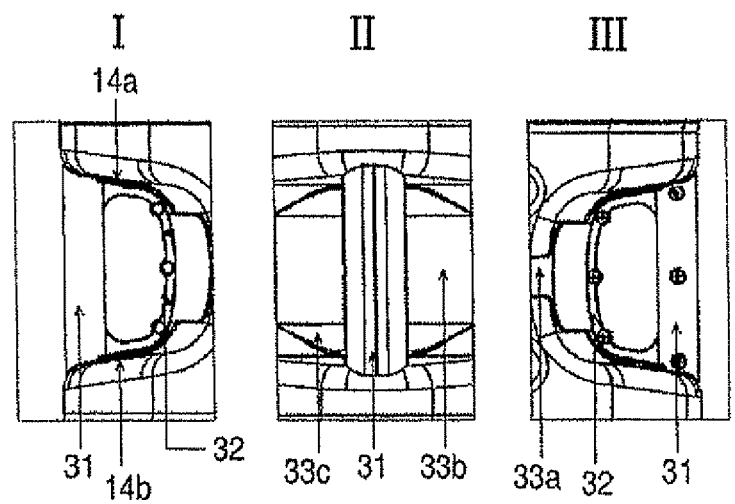
FIG. 9

STRIP-SHAPED HANDLE PART FOR DRINKING WATER BOTTLE

TECHNICAL FIELD

The present invention relates to a handle of a drinking water bottle for use with a beverage server.

BACKGROUND ART

A large amount of plastic containers are used as containers for alcohol beverages, soft drinks, mineral waters and so on. Containers with a capacity of about 1 Liter (Liter is hereinafter symbolized as "L") are easy to handle, but containers with a capacity of 2L or more are relatively difficult to handle because of their weight. Many of these containers are provided with a handle as a gripper for ease of carrying.

Beverage servers, which can chill and heat drinking water such as mineral water and deliver cold and hot water, are often seen in hotels, offices and so on. A drinking water supply bottle (which is hereinafter referred to as "drinking water bottle 1") filled with mineral water or the like is coupled to a beverage server 2 with its opening down as shown in FIG. 1. Such a drinking water bottle 1 has a capacity of 5 to 20L, and needs a handle as a gripper (which is hereinafter referred to as "handle") for ease of handling because of its size and weight. Such a drinking water bottle 1 often has a recessed body 17 as shown in FIG. 2 and a handle is attached in the recess 14 (which is hereinafter referred to as "recess of the drinking water bottle" or simply as "recess") because the handle interfere with transportation and storage if it protrudes outward from the drinking water bottle. Although not shown, some bottles have a handle which is formed into a cylindrical shape along the vertical direction of the drinking water bottle in the recess at the same time as the drinking water bottle is formed and which can contain drinking water therein. The problem of the drinking water bottles with this structure is the difficulty of washing the inner wall of the cylindrical handle in the recess when the drinking water bottles are repeatedly used. Almost of all the drinking water bottles are fabricated by injection molding of a plastic material. Thus, it is contemplated to attach a separately prepared handle to a drinking water bottle having a recess. FIG. 3 shows the outline of the method. A hollow body 43 to be a container is formed with a blow mold 4. After a preform 1 of the hollow body 43 and a separately formed handle (not shown) are inserted into a proper position in the blow mold 4, compressed air 42 is fed into the preform 41. Then, the hollow body 43 is shaped and, simultaneously, the handle and outer surfaces of the hollow body 43 are engaged with each other, whereby the handle is attached to the hollow body 43.

That is, some handles for drinking water bottles have a grip portion extending along the vertical direction of the drinking water bottle and leg portions provided at upper and lower ends of the grip portion, and is attached to a drinking water bottle by engaging the leg portions with the outer surfaces of a recess of the drinking water bottle. The outer surfaces herein are the outer surfaces of large-thickness portions of the container forming a drinking water bottle. Some handles do not have the leg portions and are attached to a drinking water bottle by directly engaging both ends of the grip portion of the handle with the outer surfaces of the recess of the drinking water bottle. In the former case, the handle is attached to the drinking water bottle with projections provided on the leg portions of the handle fitted in depressions formed in the outer surfaces of the recess of the drinking water bottle. In the latter case, the handle is attached to the drinking water bottle with the grip portion of the handle fitted in depressions formed in the outer surfaces of the recess of the drinking water bottle. In addition, some drinking water bottles have a handle attached thereto by fitting both the grip portion and leg portions of the handle into depressions formed in the outer surfaces of the recess of the drinking water bottle. In any case, the attachment of the handle to the drinking water bottle is achieved by inserting a separately formed handle into a proper position in the blow mold for a drinking water bottle and carrying out blow molding as described above. Here, the term "handle" refers to the entire portion including the grip portion and leg portions (only the grip portion if the handle does not have the leg portions), and the terms "grip portion" and "leg portion" refer to the grip portion of a handle and the leg portion of a handle unless otherwise noted. Also, the corresponding portions of the strip-shaped handle part of the present invention are also referred to as "grip portion" and "leg portion."

FIG. 4 is a partial view illustrating a handle 13 attached by engaging it with the outer surfaces 12 of the recess 14 of the drinking water bottle 1 when the drinking water bottle 1 is formed by blow molding. Stepped depressions (the contact regions 16 between the handle and the outer surfaces) to encompass both ends of the handle 13 are formed in recess top surface 14a and recess bottom surface 14b as the outer surfaces 12 of the recess 14 of the drinking water bottle 1 so that the handle can be attached to the drinking water bottle by engaging the both ends of the handle with the drinking water bottle. They are needed to secure the handle 13 to the drinking water bottle 1, and the blow mold (which may be hereinafter referred to simply as "mold" for the drinking water bottle 1 is fabricated in view of the stepped depressions to engage the both ends of the handle 13 with the drinking water bottle. When the drinking water bottle 1 is shaped, the molten resin flows into the gap around the ends of the handle 13 in the mold for the drinking water bottle but the molten resin does not flow smoothly around the contact regions 16 between the handle 13 and the outer surfaces as they have a stepped shape as described above and the portions of the drinking water bottle 1 tend to have a smaller thickness than other portions. In addition, since the molten resin moves in a complicated manner in these portions in the mold for the drinking water bottle during the shaping process, the stepped depressions are not be formed at the contact regions 16 between the handle and the outer surfaces in the recess of the drinking water bottle and the outer surface does not engage with the handle causing looseness in some cases, and, in other cases, the resin cannot flow into the spaces around the handle causing formation of a hole in the drinking water bottle, resulting in a high proportion defective in the injection molding process.

When emptied, the drinking water bottle 1 is refilled with drinking water and repeatedly used. With the above shaping method, the contact regions 16 between the handle and the outer surfaces have a smaller thickness as described above and thus has a lower strength. Therefore, the outer surfaces of the drinking water bottle 1 as the contact regions 16 between the handle and the outer surfaces may develop cracks or holes while the drinking water bottle 1 is continuously used. When the drinking water bottle develops cracks or the like, the following problem occurs.

In FIG. 1, the drinking water flows from the drinking water bottle 1 into a cold water tank 21 in the beverage server 2 through a joint 24. The cold water tank 21 has a partition 25 therein, and cooling pipes are located below the partition 25. The drinking water having flowed into the space under the partition 25 is cooled and stored in a cold water section 23. The drinking water having entered the cold water tank 21 is separated by the partition 25, some of which flows through a water conduit 27 into a hot water tank 22, and is heated by a heater 28 and stored in the hot water tank 22. The coldwater is delivered from a cold water port 29a, and the hot water from a hot water port 29b. The drinking water bottle 1 is coupled to the beverage server 2 with its opening down. Since a reduced pressure is generated in the drinking water bottle 1, the drinking water in the drinking water bottle 1 does not flow into the cold water tank 21 and the hot water tank 22 at once and the water levels in the cold water tank 21 and the hot water tank 22 are maintained constant even if the drinking water bottle is placed with its opening down. When an outer surface of the drinking water bottle has a crack or the like, since the reduced pressure in the drinking water bottle is released, the drinking water in the drinking water bottle flows into the cold water tank 21 and the hot water tank 22 at once and overflows from the cold water tank 21 and the hot water tank 22, losing the function of the beverage server 2. To avoid such a problem, it is necessary to increase the thickness of the contact regions 16 between the handle and the outer surfaces of the drinking water bottle 1 and to ensure close contact between the handle and the drinking water bottle so that the drinking water bottle 1 can withstand repetitive use. The term "close contact" herein refers to a state where the handle and the drinking water bottle are in close contact without any space therebetween.

On the other hand, some drinking water bottle are made of a material different from the material of their handles depending on the intended use. For example, some drinking water bottles are made of polyethylene terephthalate with their handles made of polypropylene. When broken drinking water bottles are disposed and reused, it is necessary to sort and collect different materials separately. However, when the drinking water bottle and the handle are engaged with and attached to each other, it takes time and labor to sort and collect different materials separately even if the materials used are different, making it difficult to recycle the materials.

As one method for providing a handle to a drinking water bottle, there is a container gripper which can be easily secured to a bottle with a capacity of about 2L (Patent Document 1). Another method is to form a recess in the body of the container and fit a handle in the recess along the vertical direction of the container so that it does not take space during storage and transportation (Patent Document 2). It is believed that both of the above can fulfill the function as a handle of a container with a capacity of about 2L. However, the drinking water bottles for use with beverage servers have a capacity of 5 to 20L, and these structures cannot provide sufficient strength.

Other examples include a plastic bottle having an opening formed through its body in the vicinity of a ridge part of the body so that the ridge part can be used as a handle (Patent Document 3), a container having a handle extending from the shoulder along a side wall of the container body to allow for insertion of fingers (Patent Document 4), and a container having recesses for better grip in the body of the container and a plurality of annular ribs below the recesses (Patent Document 5). In these inventions, expenses including the cost for a mold to fabricate the handled drinking water bottle are high, and there is a concern about the strength to handle containers with a capacity of 5 to 20L.

Furthermore, there is an application of a container having a body with a recess and a handle fitted in the recess such that the container and the handle can be easily separated (Patent Document 6). In this method, however, there remains concerns about the proportion defective in the process of injection molding of the containers, the strength of the contact regions between the handle and the outer surface of the container and so on as described above.

Patent Document 1: JP-A-2005-41513
Patent Document 2: JP-U-Hei 5-51730
Patent Document 3: JP-A-Hei 8-318921
Patent Document 4: JP-A-2001-146237
Patent Document 5: JP-A-2003-226315
Patent Document 6: JP-A-Hei 10-297635

DISCLOSURE OF THE INVENTION

Problem to be Solved by the Invention

Therefore, the problem to be solved by the invention is to provide a handle for a drinking water bottle for use with a beverage server. According to the handle for a drinking water bottle, the proportion defective can be reduced in the process of forming a drinking water bottle, the drinking water bottle with the handle can be repeatedly used, and separation of the handle and drinking water bottle can be facilitated at the time of disposal.

Means for Solving the Problem

To solve the problem, it is contemplated to produce what is called a strip-shaped handle intended to be wound around a drinking water bottle to attach a handle thereto separately from the production of the drinking water bottle, and secure the handle to the drinking water bottle to attach a handle thereto. That is, it is a strip-shaped handle part to attach a handle to the drinking water bottle, including a strip configured to be wound around the body of a drinking water bottle; and grip portion halves and leg portion halves of an equally-divided handle coupled to opposite ends of the strip, and intended to be secured to a drinking water bottle to attach a handle thereto by winding the strip around the body of the drinking water bottle and joining the mating surfaces of the grip portion halves and leg portion halves of the equally-divided handle in a face-to-face fashion.

The drinking water bottle 1 has a capacity of 5 to 20L, and therefore a large load is applied to the handle and so on of the strip-shaped handle part because of the size and weight of the drinking water bottle 1. Thus, the strip-shaped handle part needs to have enough strength to withstand the load. On the other hand, since the strip-shaped handle part required to have high strength is made of a material lacking in flexibility, it is difficult to wind the strip of the strip-shaped handle part closely around the drinking water bottle. Also, after the handle is attached to a drinking water bottle by winding the strip-shaped handle part around it, a gap may be formed between the drinking water bottle and the strip-shaped handle part to cause so-called looseness while the drinking water bottle is repeatedly used, resulting in displacement of the handle or development of cracks or holes in the drinking water bottle. Thus, to wind the strip-shaped handle part closely around the drinking water bottle, it is contemplated to impart flexibility or stretching properties to the strip of the strip-shaped handle by providing the strip with cut-out openings or bellows sections. However, those may be not enough to attach the handle to the drinking water bottle stably. In such a case, when a cushion member which doubles as a slip stopper is provided on the surface of the strip-shaped handle part which is intended to be in contact with the drinking water bottle, the cushion member prevents formation of a gap between the strip-shaped handle part and the drinking water bottle and prevents slippage of the strip-shaped handle part to prevent the handle from moving out of place or the drinking water bottle from developing cracks and holes even if the drinking water bottle is used for a long period of time. Therefore, we have conceived of providing a cushion member which doubles as a slip stopper on the surface of the strip-shaped handle part which is intended to be in contact with the drinking water bottle.

That is, the invention of claim 1 is a strip-shaped handle part to attach a handle to a drinking water bottle for supplying drinking water to a beverage server, including a strip configured to be wound around the body of a drinking water bottle; and grip portion halves and leg portion halves of an equally-divided handle coupled to opposite ends of the strip, and intended to be secured to a drinking water bottle to attach a handle thereto by winding the strip around the body of the drinking water bottle and joining the mating surfaces of the grip portion halves and leg portion halves of the equally-divided handle in a face-to-face fashion.

A beverage server is a device which serves drinking water such as hot water or cold water as described above, and FIG. 1 shows a schematic view thereof. The term "drinking water" refers not only to mineral water but also to anything to drink such as soft drinks. The term "drinking water bottle" refers to a container which is filled with drinking water and supplies the drinking water to a beverage server and which is used repeatedly. The term "equally-divided" expresses the fact that the handle, which is to be attached along the vertical direction of the drinking water bottle, is cut at its center along the vertical direction into right and left halves, and expresses the fact that the grip portion and the leg portion as portions of the handle are also divided similarly into equal halves. Although the term "equally" is used, the divided right and left halves of the handle are not necessarily identical to each other as viewed along the vertical direction of the drinking water bottle. This is because when the divided grip portion halves and leg portion halves of the handle are joined by clamping or tapping screws in screw holes, the divided right and left halves of the handle may have different shapes. The handle of the drinking water bottle is attached to the body of the drinking water bottle along the vertical direction of the drinking water bottle. The handle is equally divided along its vertical direction into halves, which are attached to opposite ends of the strip. The handle has a grip portion and a leg portion, which are also equally divided into halves. The division surfaces serve as mating surfaces of the grip portion halves and the leg portion halves of the handle. The strip of the strip-shaped handle part is wound around the body of the drinking water bottle, and then the mating surfaces are joined to each other to secure the strip-shaped handle part to the drinking water bottle, whereby a handle is attached to the drinking water bottle. The width of the strip of the strip-shaped handle part may vary depending on the circumferential contour of the body of the drinking water bottle and is not necessarily constant along its entire length. The longitudinal direction of the strip-shaped handle part, that is, the direction in which the divided handle halves are coupled is referred to as the length, and the length in the direction perpendicular to the longitudinal direction is referred to as the width of the strip or simply as width. Examples of the means for joining the mating surfaces of the grip portion halves and the leg portion halves of the handle include, but are not limited to screwing, welding, adhesion, and clamping. It should be noted that when the term "secure" referred to as the action of fastening the strip-shaped handle part around the drinking water bottle and that when the strip-shaped handle part has been fastened around the drinking water bottle as a handle as a result of securing, the term "(the handle) is attached" is used.

In the second invention the strip of the strip-shaped handle part is configured to be wound around the body of a drinking water bottle, and the strip has a plurality of cut-out openings.

The drinking water bottle is not limited to the one having a circular cylindrical body, and the body may have a square cylindrical shape, hexagonal cylindrical shape, or other shape. When a strip-shaped handle part is wound across the corners of a polygonal cylindrical body, the strip is required to have bendability. Without bendability, the strip of the strip-shaped handle part does not conform to the corners of the drinking water bottle and gaps are formed between the strip of the strip-shaped handle part and the drinking water bottle, resulting in so-called looseness.

Therefore, cut-out openings are formed in some portions of the strip-shaped handle part to impart bendability to the portions. In other words, the width of the strip is reduced to increase the flexibility of the portions to ensure that the portions conform to the corners. It should be noted that the term "close contact" refers, unless otherwise noted, not to being integrated by bonding with an adhesive or the like but to a state where the strip of the strip-shaped handle part and the body of drinking water bottle are in close contact without any space therebetween as described above.

The invention of claim 3 is the strip-shaped handle part of claim 1 or claim 2, in which, as for the strip of the strip-shaped handle part configured to be wound around the body of a drinking water bottle, a portion of the strip has a bellows structure.

The bellows structure is, in other words, a flexible structure consisting of mountain folds and valley folds.

The bellows structure is provided to a portion of the strip of the strip-shaped handle part to impart stretching properties to the strip so as to facilitate winding of the strip around the body of the drinking water bottle and to ensure close contact between the drinking water bottle and the strip-shaped handle part.

The claim 4 invention is the strip-shaped handle part of any one of claim 1 to claim 3, fabricated by injection molding and made of plastic.

This is to limit the method for production the strip-shaped handle part and the material thereof. The term "injection molding" refers to a method where a molten plastic is injected and filled into a mold under pressure and shaped by cooling. The term "plastic" refers to a polymeric material having plasticity and includes an elastic polymeric material such as rubber.

The invention of claim 5 is the strip-shaped handle part of claim 4, formed in conformity with the circumferential contour of the body of the drinking water bottle.

The circumferential contour of the body of a drinking water bottle means the curvature and the surface geometry of the outer surface of the body of the drinking water bottle. The body may be of various shapes such as circular cylindrical or polygonal cylindrical with or without recesses. In addition, some drinking water bottles have ribs on the surface of their body for reinforcement. If the strip of the strip-shaped handle part to be wound around the body is shaped two-dimensionally, even if it is made of an elastic plastic material, the strip does not conform to the curvature and surface geometry of the drinking water bottle and does not make close contact with the outer surface of the drinking water bottle, resulting in looseness between the strip-shaped handle part and the drinking water bottle. Thus, a mold for a strip-shaped handle part corresponding in shape to the circumferential contour of the drinking water bottle is prepared in advance, and a strip-shaped handle part is formed using the mold to ensure close contact with the drinking water bottle thereby preventing looseness between the strip-shaped handle part and the drinking water bottle. Above all, in the case of a drinking water bottle having a recess, the strip of the strip-shaped handle part needs to be bent at an angle close to 90 degrees at the corners defining the recess because the handle is attached in the recess. Therefore, the strip of the strip-shaped handle part may be formed to have bends of about 90 degrees in advance in conformity with the shape of the corners.

Alternatively, the strip of the strip-shaped handle part may be formed into a U-shape to ensure that the strip of the strip-shaped handle part conforms to the top surface and bottom surface of the recess. One reason for this is that a less loose handle can be attached when the strip-shaped handle part is secured in close contact with the drinking water bottle. Another reason is that a mold having a curved shape may be prepared at a lower cost in injection molding.

The invention of claim 6 is a handled drinking water bottle with a handle attached thereto by winding the strip-shaped handle part of any one of claim 1 to claim 5 around the body of a drinking water bottle and joining mating surfaces of the grip portion halves and leg portion halves of the divided handle of the strip-shaped handle part in face-to-face fashion to secure the strip-shaped handle part to the drinking water bottle.

Some drinking water bottles have a circular cylindrical shape or a polygonal cylindrical shape without a recess in their body. Since the strip-shaped handle part can be secured to the body of such a drinking water bottle to attach a handle thereto, the handled drinking water bottle is included in the scope of rights.

The invention of claim 7 is a handled drinking water bottle with a handle attached thereto by winding the strip-shaped handle part of any one of claim 1 to claim 5 around the body of a drinking water bottle with a recess in the body thereof and joining mating surfaces of the grip portion halves and leg portion halves of the divided handle of the strip-shaped handle part in face-to-face fashion to secure the strip-shaped handle part to the drinking water bottle with both the opposite ends of the joined grip portion and the opposite ends of the joined leg portion of the strip-shaped handle part, or either the opposite ends of the joined grip portion or the opposite ends of the joined leg portion of the strip-shaped handle part in close contact with the upper and lower outer surfaces of the recess of the drinking water bottle.

Many drinking water bottles have a body with a recess and a handle attached in the recess for the convenience of transportation and storage. The invention described in claim 7 is limited to the case where the strip-shaped handle part is attached to a drinking water bottle having a body with a recess. Utilizing the fact that the drinking water bottle has a recess, the strip-shaped handle part is secured to the drinking water bottle with the ends of the grip portion and leg portion in close contact with the upper and lower surface of the recess to reduce looseness between the strip-shaped handle part and the drinking water bottle in order to increase the frequency at which the handled drinking water bottle is repeatedly used. Only the ends of the grip portion or the ends of the leg portion may be in close contact with the upper and lower surfaces of the recess depending on the shape of the body of the drinking water bottle.

The invention of claim 8 is a cushioned strip-shaped handle part obtained by providing a cushion member which doubles as a slip stopper cushion on the surface of the strip-shaped handle part of any one of claims 1 to claim 5, the surface being intended to be in contact with the drinking water bottle.

The strip-shaped handle part is wound around and secured to a drinking water bottle to attach a handle thereto. A cushion member which doubles as a slip stopper is provided on the surface of the strip-shaped handle part which is intended to be in contact with the drinking water bottle to further ensure close contact between the strip-shaped handle part and the drinking water bottle and to prevent looseness between the strip-shaped handle part and the drinking water bottle and displacement of the handle even when the drinking water bottle is used for a long period of time. The strip-shaped handle part provided with a cushion member which doubles as a slip stopper is referred to as "cushioned strip-shaped handle part."

Examples of the cushion member which doubles as a slip stopper include, but are not limited to foamed resins and rubber plates having a high friction coefficient and flexibility. Any material will suffice as long as it has anti-slip and cushioning properties. The cushion member which doubles as a slip stopper is formed by punch pressing or other method in conformity with the shape of the strip-shaped handle part and attached to the strip-shaped handle part. Examples of the method for attaching the cushion member which doubles as a slip stopper to the strip-shaped handle part include, but are not limited to welding and adhesive bonding. Any method will suffice as long as the cushion member which doubles as a slip stopper and the strip-shaped handle part can be integrated with each other.

The cushion member which doubles as a slip stopper is provided on the entire surface or a part of the surface of the strip-shaped handle part which is intended to be in contact with the drinking water bottle, and, in either case, the strip-shaped handle part provided with the cushion member which doubles as a slip stopper is referred to as "cushioned strip-shaped handle part."

The invention of claim 9 is a handled drinking water bottle with a handle attached thereto by winding the cushioned strip-shaped handle part of claim 8 around the body of a drinking water bottle and joining mating surfaces of the grip portion halves and leg portion halves of the divided handle of the cushioned strip-shaped handle part in face-to-face fashion to secure the strip-shaped handle part to the drinking water bottle.

The claim 9 invention is obtained by substituting the cushioned strip-shaped handle part for the strip-shaped handle part in the invention of claim 6. Some drinking water bottles have a circular cylindrical shape or a polygonal cylindrical shape without a recess in their body. Since the cushioned strip-shaped handle part can be secured to the body of such a drinking water bottle to attach a handle thereto as in the case with claim 6, the handled drinking water bottle is included in the scope of rights. When the cushioned strip-shaped handle part is used, since it can be tightly wound around and secured to a drinking water bottle because of the cushion member which doubles as a slip stopper on the inner surface thereof, a gap is less likely to be formed between the cushioned strip-shaped handle part and the drinking water bottle. Therefore, the looseness which may occur between the cushioned strip-shaped handle part and drinking water bottle can be reduced and the frequency at which the handled drinking water bottle can be repeatedly used can be increased. The term "handled drinking water bottle" refers to a drinking water bottle to which the strip-shaped handle part or the cushioned strip-shaped handle part is secured to attach a handle thereto.

The invention of claim 10 is a handled drinking water bottle with a handle attached thereto by winding the cushioned strip-shaped handle part of claim 8 around the body of a drinking water bottle with a recess in the body thereof and joining mating surfaces of the grip portion halves and leg portion halves of the divided handle of the cushioned strip-shaped handle part in face-to-face fashion to secure the cushioned strip-shaped handle part to the drinking water bottle with both the opposite ends of the joined grip portion and the opposite ends of the joined leg portion of the cushioned strip-shaped handle part, or either the opposite ends of the joined grip portion or the opposite ends of the joined leg portion of the cushioned strip-shaped handle part in close contact with the upper and lower outer surfaces of the recess of the drinking water bottle.

The claim 10 invention is obtained by substituting the cushioned strip-shaped handle part for the strip-shaped handle part in the invention of claim 7. Many drinking water bottles have a body with a recess and a handle attached in the recess for the convenience of transportation and storage. The invention described in claim 10 is limited to the case where the cushioned strip-shaped handle part is attached to a drinking water bottle having a body with a recess. Utilizing the fact that the drinking water bottle has a recess, the cushioned strip-shaped handle part is secured to the drinking water bottle with the ends of the grip portion and leg portion in close contact with the upper and lower surface of the recess to reduce the gap between the cushioned strip-shaped handle part and the drinking water bottle thereby reducing looseness between the cushioned strip-shaped handle part and the drinking water bottle in order to increase the frequency at which the handled drinking water bottle is repeatedly used. Only the ends of the grip portion or the ends of the leg portion may be in close contact with the upper and lower surfaces of the recess depending on the shape of the body of the drinking water bottle.

Effect of the Invention

According to the strip-shaped handle part described in claim 1, since the strip-shaped handle part is produced separately from the drinking water bottle, various types of strip-shaped handle parts can be produced depending on the capacity and contour of the drinking water bottle, and a handle having sufficient strength to handle a drinking water bottle with a capacity of 5 to 20L can be attached to the drinking water bottle. In addition, since the process of attaching a handle simultaneously with the blow molding of the drinking water bottle is not necessary, it is possible to reduce defective molding of the drinking water bottle, increase the thickness of the contact surfaces of the drinking water bottle and the handle, prevent development of cracks in the drinking water bottle, and achieve a reusable drinking water bottle. In addition, since the drinking water bottle and the handle can be easily separated even if the drinking water bottle and the handle are made of different materials, they can be collected separately at the time of disposal and contribute to recycling of materials.

According to the strip-shaped handle part described in claim 2, since bendability is imparted to the strip of the strip-shaped handle part by forming cut-out openings in the strip, the strip-shaped handle part can be secured in close contact with the drinking water bottle. In particular, the cut-out openings are effective to hold the strip of the strip-shaped handle part to close contact with corners of a polygonal cylindrical drinking water bottle.

According to the strip-shaped handle part described in claim 3, since a portion of the strip of the strip-shaped handle part has a bellows structure, the strip has stretching properties and the strip-shaped handle part can be secured in closer contact with the drinking water bottle.

According to the strip-shaped handle part of claim 4, since the strip-shaped handle part is produced by injection molding using plastic as the material, the production cost can be reduced.

According to the invention of claim 5, since the strip-shaped handle part is formed in conformity with the circumferential contour of the body of the drinking water bottle, securing of the strip-shaped handle part to the drinking water bottle can be facilitated and the strip-shaped handle part can be secured in close contact with the drinking water bottle.

According to the handled drinking water bottle of claim 6, a drinking water bottle without a recess in the body and with a large capacity of, for example, 5 to 20L can be made into a handled drinking water bottle by securing a strip-shaped handle part to the drinking water bottle.

According to the handled drinking water bottle of claim 7, since the strip of the strip-shaped handle part as well as the grip portion and so on of the handle make close contact with the outer surfaces of the recess of the drinking water bottle with a recess, the contact area between the handle and the drinking water bottle is increased and a handled drinking water bottle which does not develop so-called looseness between the handle and the drinking water bottle can be achieved.

According to the cushioned strip-shaped handle part of claim 8, the cushion member allows the cushioned strip-shaped handle part to be wound around and secured to a drinking water bottle more tightly than the strip-shaped handle part and can prevent looseness and displacement of the attached handle.

According to the invention of claim 9, a handled drinking water bottle with the cushioned strip-shaped handle part secured to a drinking water bottle having a body without a recess and a large capacity of, for example, 5 to 20L to attach a handle thereto has sufficient durability to withstand the long term use and so on.

In addition, since the cushioned strip-shaped handle part is wound on the outer surface of the drinking water bottle, even if the drinking water bottle collide with other bottles or walls during transportation, development of cracks or holes in the drinking water bottle can be reduced.

According to the invention of claim 10, since the strip of the cushioned strip-shaped handle part as well as the grip portion and so on of the handle make close contact with the outer surfaces of the recess of the drinking water bottle with a recess, the contact area between the handle and the drinking water bottle is increased and a handled drinking water bottle which does not develop so-called looseness between the handle and the drinking water bottle can be achieved. In addition, since the cushioned strip-shaped handle part is wound on the outer surface of the drinking water bottle, even if the drinking water bottle collide with other bottles or walls during transportation, development of cracks or holes in the drinking water bottle can be reduced as in the case with the cushioned strip-shaped handle part of claim 9.

BRIEF DESCRIPTION OF DRAWINGS

[FIG. 1] schematic view of beverage server
[FIG. 2] drinking water bottle
[FIG. 3] hollow body shaping diagram
[FIG. 4] contact regions between outer surfaces of drinking water bottle and handle
[FIG. 5] strip-shaped handle part
[FIG. 6] strip-shaped handle part with cut-out openings
[FIG. 7] strip-shaped handle part with cut-out openings and bellows sections
[FIG. 8] perspective view of drinking water bottle provided with strip-shaped handle part
[FIG. 9] enlarged views of handle part of drinking water bottle provided with strip-shaped handle part
[FIG. 10] rear view of handled drinking water bottle provided with strip-shaped handle part

DESCRIPTION OF REFERENCE NUMERALS

Figure 3:
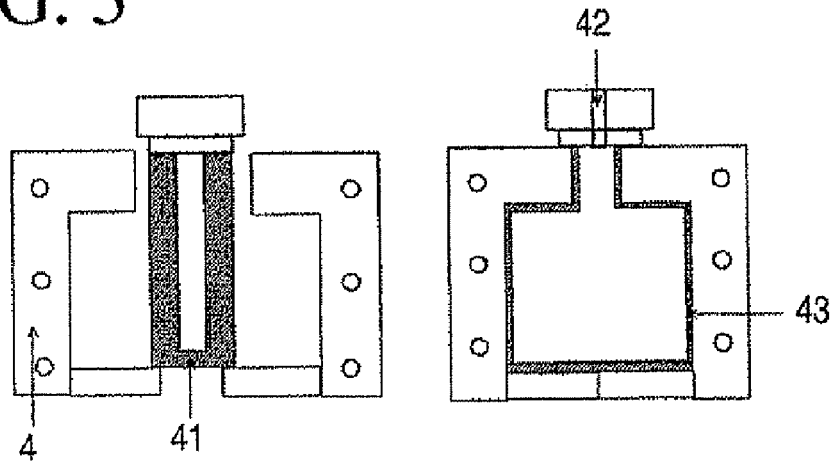
Figure 4:
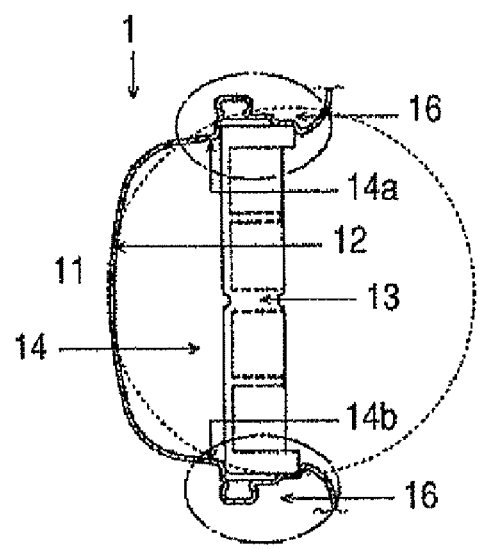

1: drinking water bottle 11: inside (of drinking water bottle) 12: outer surface (of drinking water bottle container) 13: handle 14: recess 14a: recess top surface 14b: recess bottom surface 15: opening 16: contact region between handle and outer surface 18: corner portion 2: beverage server 21: cold water tank 22: hot water tank 23: cold water section 24: joint 25: partition 26: cooling pipe 27: water conduit 28: heater 29a: cold water port 29b: hot water port 3: strip-shaped handle part 31: grip portion 32: leg portion (handle 13 may include 31 grip portion and 32 leg portion) 33a: bent portion 33b: connecting section of strip to handle 33c: section of strip intended to be in close contact with recess top surface or recess bottom surface 34: grip portion mating surface 35: leg portion mating surface 36: screw hole 37: rib 38: cut-out opening 39: bellows section 4: mold 41: perform 42: compressed air 43: hollow body 5: cushion member which doubles as slip stopper 6: cushioned strip-shaped handle part, the reference numerals 31 to 39 for the strip-shaped handle part are also used for the elements of the cushioned strip-shaped handle part as needed.

7: handled drinking water bottle

Best Mode For Carrying Out The Invention

An example in which the strip-shaped handle is used is described below.

First Embodiment

Figure 5:
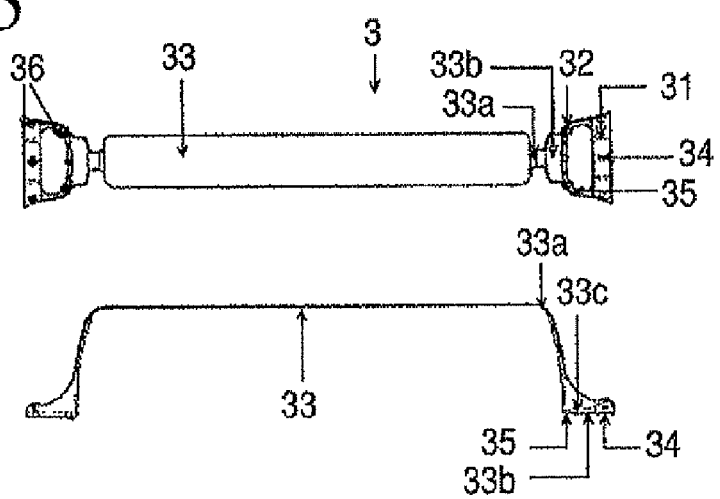

FIG. 5 to FIG. 7 show a development view of a strip-shaped handle part. FIG. 5 shows a front view and a plan view of a strip-shaped handle part 3 having neither a cut-out opening nor a bellows structure. FIG. 6 shows a strip-shaped handle part 3 having cut-out openings 38, and FIG. 7 shows a strip-shaped handle part 3 having cut-out openings 38 and bellows sections 39. In FIG. 6 and FIG. 7, the plan views are omitted since they are the same as that in FIG. 5. All the strip-shaped handle parts 3 are for a drinking water bottle 1 having a recess 14 in its body, and the sections 33a of the strip 33 which are intended to be in contact with the corner portions 18 of the recess 14 of the drinking water bottle 1 are bent to fit the corner portions 18 and have a decreased width so that the strip can closely conform to the corner portions 18 curved along the vertical direction of the drinking water bottle. The reference number 33b indicates strips which connect the sections 33a intended to be in contact with the corner portions 18 and leg portion halves, are sections intended to be in close contact with side surfaces of the recess 14, and have an increased width. The reference number 33c indicates sections formed by curving the sections of the strip from leg portions 32 to grip portions 31 into a three-dimensional shape so that the strip can closely conform to a recess top surface 14a and a recess bottom surface 14b. These embody the invention described in claim 5. As the material of the strip-shaped handle part, polypropylene was used.

The drinking water bottle 1 is not limited to a circular cylindrical shape and may have a polygonal cylindrical shape. In the case of a drinking water bottle 1 having a polygonal cylindrical shape, the strip-shaped handle part 3 must be wound such that the strip-shaped handle part 3 closely conform to the corners of the drinking water bottle 1, and the corresponding portions of the strip are required to have bendability. Thus, cut-out openings 38 are provided in the portions of the strip intended to be in close contacted with the corner portions of the drinking water bottle to reduce the width of the strip as shown in FIG. 6. In addition, ribs 37 are provided on both sides of the cut-out openings 38 to reinforce the strength of the strip. The level of drinking water in the drinking water bottle can be seen through the cut-out openings. In FIG. 7, the strip-shaped handle part has bellows sections 39 above and below the cut-out openings 38. The bellows sections 39 can impart stretchability to the strip-shaped handle part, facilitate securing of the strip-shaped handle part to the drinking water bottle, and ensure close contact between the drinking water bottle and the strip-shaped handle part.

FIG. 8 and FIG. 9 respectively show a perspective view of a handled drinking water bottle with a strip-shaped handle part secured to a hexagonal cylindrical bottle, and enlarged views of where the handle is attached. In the enlarged views of the handle in FIG. 9, I, II, and III are views seen from the left, front, and right, respectively. The drinking water bottle 1 has a body 17 with a recess 14, and the handle is attached in the recess 14. A strip-shaped handle part 3' having cut-out openings 38 is used. The length of the strip 33', the ribs 37, the cut-out openings 38 and a bent portion of the strip-shaped handle part 3' are integrally formed in advance using a mold shaped in conformity with the shape of the drinking water bottle 1. The strip-shaped handle part is wound around the drinking water bottle such that grip portion mating surfaces 34 and leg portion mating surfaces 35 are located at the center of the side surface of the recess 14 of the drinking water bottle, and the grip portion mating surfaces 34 and the leg portion mating surfaces 35 are mated with each other and held tightly against each other with a clamp or the like. Then, tapping screws are inserted into screw holes 36 to join the grip portion mating surfaces 34 and the leg portion mating surfaces 35 to secure the strip-shaped handle part 3 to the drinking water bottle 1, whereby the handle is attached to the drinking water bottle 1. At this time, adjustments are made such that the sections 33c of the strip intended to be in close contact with the recess top surface and the recess bottom surface are in close contact with the recess top surface 14a and the recess bottom surface 14b of the drinking water bottle 1 and the grip portion 31 and the leg portion 32 are in close contact with the recess top surface 14a and the recess bottom surface 14b in order to prevent so-called looseness between the strip-shaped handle part and the drinking water bottle from occurring.

Figure 10:
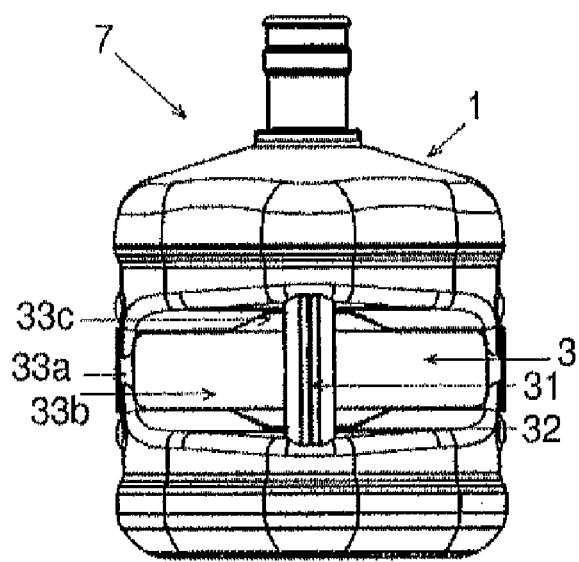
Figure 11:
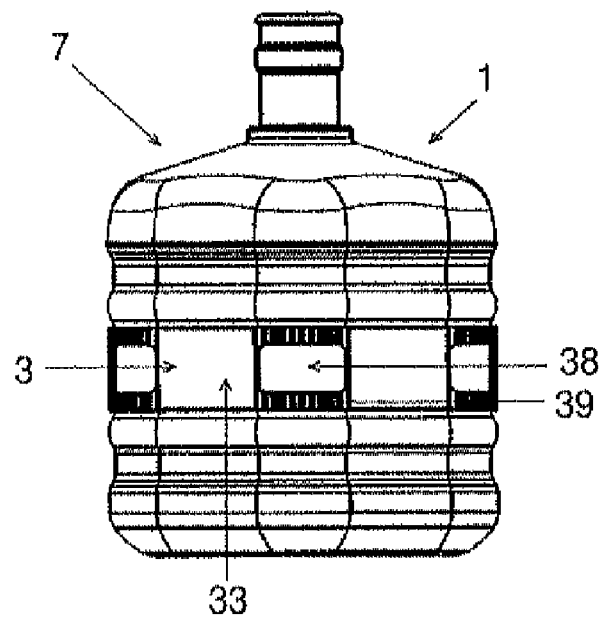
[FIG. 11] side view of handled drinking water bottle provided with strip-shaped handle part

FIG. 10 and FIG. 11 show a handled drinking water bottle with a strip-shaped handle part 3" having cut-out openings 38 and bellows sections 39 secured to the drinking water bottle 1. As shown in FIG. 10, the strip-shaped handle part is secured to the drinking water bottle such that its handle is located at the center of the recess in the body of the drinking water bottle. Polycarbonate is used as the plastic material of the drinking water bottle, and polypropylene is used for the strip-shaped handle part as described above. The strip-shaped handle parts are secured to drinking water bottles, and the drinking water bottles is shipped as handled drinking water bottles. After the inside of the drinking water bottles is sterilized in a drinking water manufacturing facility, the drinking water bottles are filled with drinking water, shipped, and set on beverage servers. Then, the handled drinking water bottles are repeatedly used. The same is hold true for the handled drinking water bottles 7 with the cushioned strip-shaped handle parts 6 instead of the strip-shaped handle parts secured to drinking water bottles 1.

Figure 12:
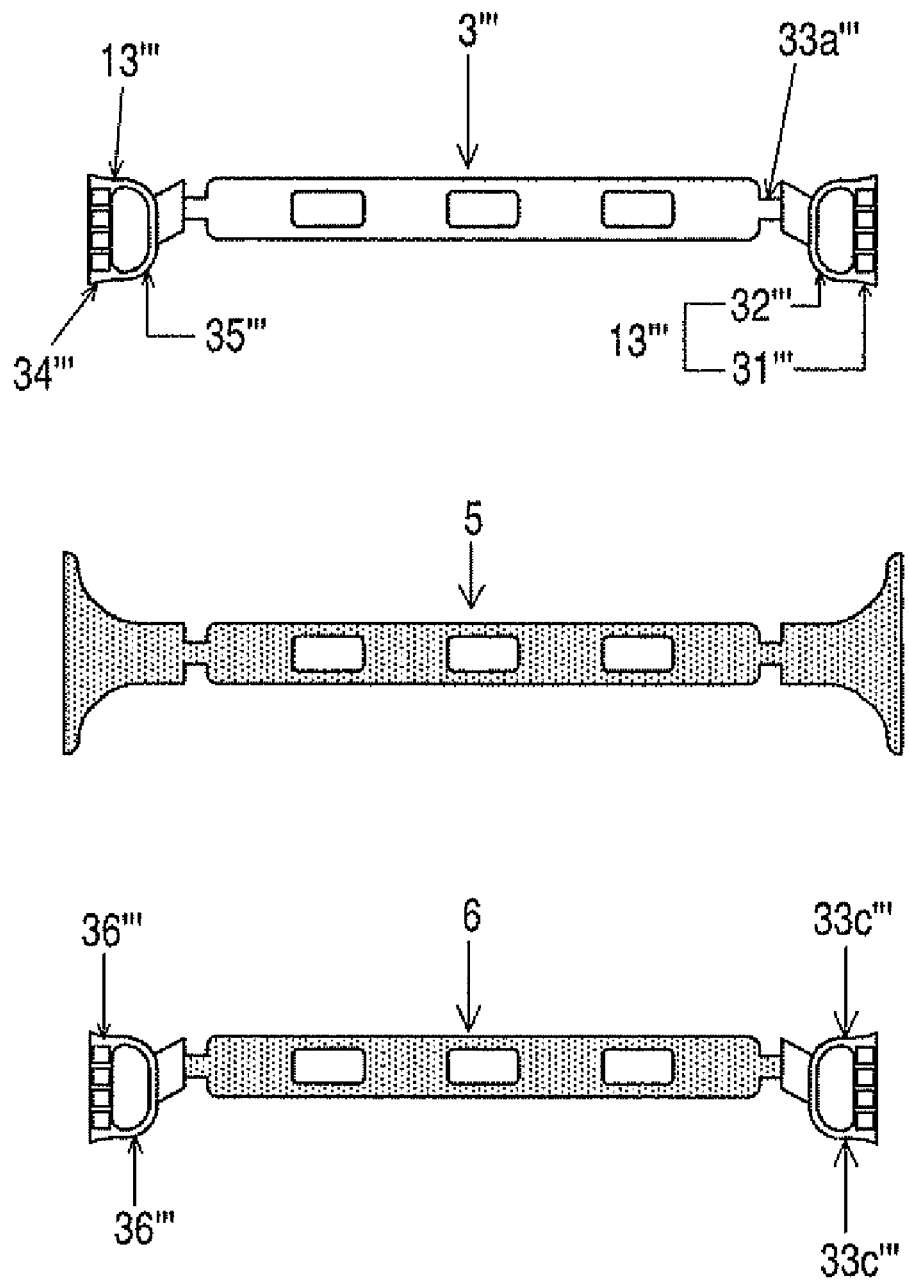
[FIG. 12] strip-shaped handle part, cushion member which doubles as a slip stopper, and cushioned strip-shaped handle part

FIG. 12 shows photographs of the strip-shaped handle part 3''', a cushion member 5 which doubles as a slip stopper, and the cushioned strip-shaped handle part 6. The strip-shaped handle part 3 has been formed into a three-dimensional shape to fit the shape of the drinking water bottle using a mold, and has cut-out openings 38. The cushion member which doubles as a slip stopper is fabricated by press-punching a foamed polyethylene sheet with a thickness of about 2 mm in conformity with the shape of the strip-shaped handle part 3'''. The cushion member which doubles as a slip stopper is fabricated punched in conformity with the shapes of the strip-shaped handle part 3''' because, in the case of a strip-shaped handle part having cut-out openings and so on, the cushion member is fabricated in conformity with the shape the cut-out openings and so on. A foamed polyethylene sheet is selected because it has a closed cell structure therein and is used as packing and as a result of experiment and investigation on the properties as a slip stopper and occurrence of looseness in the company. However, the cushion member which doubles as a slip stopper is not limited as long as it fulfills required functions. The cushion member 5 which doubles as a slip stopper has flexibility and is bonded to the strip-shaped handle part 3''' with an adhesive to obtain a cushioned strip-shaped handle part 6. The cushioned strip-shaped handle part 6 in FIG. 12 has a cushion member 5 which doubles as a slip stopper covering the entire surface intended to be in contact with the drinking water bottle 1.

Figure 13:
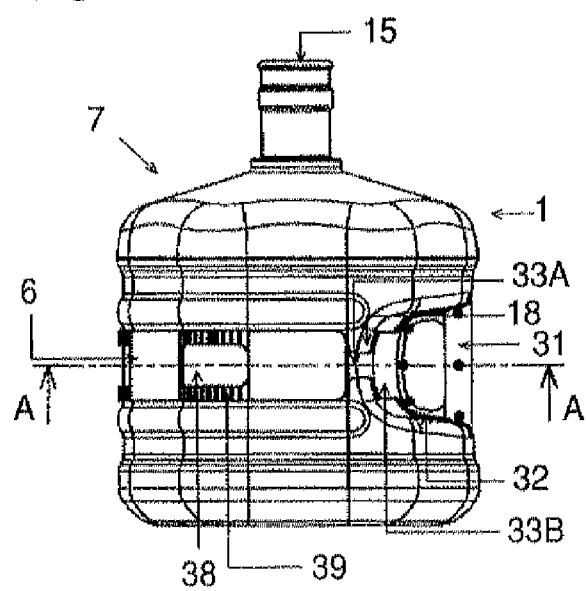
[FIG. 13] cross-sectional view and so on of handled drinking water bottle provided with cushioned strip-shaped handle part
Figure 13:
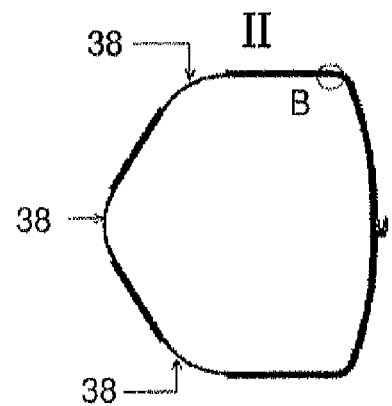
Figure 13:
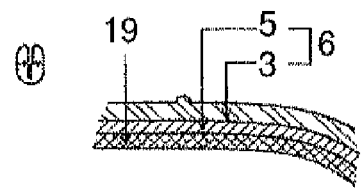

FIG. 13I shows a handled drinking water bottle 7 with the cushioned strip-shaped handle part 6 secured to a drinking water bottle 1 to attach a handle thereto. However, it is generally the same in appearance as the handled drinking water bottle 7 with the strip-shaped handle part secured to a drinking water bottle 1 to attach a handle thereto. This is because the cushion material 5 which doubles as a slip stopper is located between the strip-shaped handle part 3'''. and the drinking water bottle 1 and is therefore hardly visible from outside. Thus, FIG. 8 to FIG. 11 are the same even if the cushioned strip-shaped handle part 6 is secured to the drinking water bottle 1 to attach a handle thereto instead of the strip-shaped handle part 3". FIG. 13II shows a cross-sectional view of the handled drinking water bottle 7 using a cushioned strip-shaped handle taken along the line A-A. In addition, FIG. 13III shows a cross-sectional view of the part of the cushioned strip-shaped handle within the circle B shown in the A-A cross-sectional view. The cushioned strip-shaped handle part 6 is obtained by attaching the cushion member 5 which doubles as a slip stopper to the strip-shaped handle part 3'''.

Industrial Applicability

Since beverage servers are widely spreading, it is estimated that the demand for drinking water bottles for use therewith will continue to increases. According to the strip-shaped handle part and the cushioned strip-shaped handle part of the present invention, there can be provided handles which can be adapted to drinking water bottles of various capacities and shapes, and the handled drinking water bottles provided with the strip-shaped handle part or the cushioned strip-shaped handle part can be used for a long period of time. In addition, since separate collection can be easily done at the time of disposal of the drinking water bottles, the material can be recycled. Therefore, it is expected that the present invention will hereafter be widely used.

The invention claimed:

1. A handled drinking water bottle with a strip of a strip-shaped handle part wound around the body of a drinking water bottle with a recess in the body thereof for supplying drinking water to a beverage serve, wherein the strip-shaped handle part comprises: the strip wound around the body of the drinking water bottle; and grip portion halves and leg portion halves of an equally-divided handle coupled to opposite ends of the strip, and is secured to the drinking water bottle by winding the strip around the body of the drinking water bottle and joining mating surfaces, of the equally-divided grip portion and the leg portion in a face-to-face fashion at the center of a recess side surface of the recess, wherein the strip comprises: first sections in contact with corner portions of the recess of the drinking water bottle, the first sections being formed in a curved shape to narrow the width of the strip at the first sections;

connecting second sections connecting to the handle, which function as strips for connecting the first sections in contact with the corner portions and the leg portion halves and widen the width of the strip to make the strip in close contact with the recess side surface; and third sections in close contact with recess top surface and recess bottom surface which are formed by curving the sections of the strip from the leg portion halves to the grip portion halves into a three-dimensional shape so that the strip can closely conform to the recess top surface and the bottom surface, and wherein the handle is attached to the drinking water bottle such that upper and lower ends of the grip portion are in close contact with the top surface and the bottom surface of the recess.

2. The handled drinking water bottle of claim 1, wherein the strip has a plurality of cut-out openings.

3. The handled drinking water bottle of claim 2, wherein the strip-shaped handle part is wound around the body of the drinking water bottle in conformity with the circumferential contour of the body of the drinking water bottle.

4. The handled drinking water bottle of claim 3, wherein the strip-shaped handle part is provided with a cushion member.

5. The handled drinking water bottle of claim 1, wherein a portion of the strip has a bellows structure.

6. The handled drinking water bottle of claim 5, wherein the strip-shaped handle part is wound around the body of the drinking water bottle in conformity with the circumferential contour of the body of the drinking water bottle.

7. The handled drinking water bottle of claim 6, wherein the strip-shaped handle part is provided with a cushion member.

8. The handled drinking water bottle of claim 1, wherein the drinking water bottle and the strip-shaped handle part are fabricated by injection molding and made of plastic.

9. The handled drinking water bottle of claim 8, wherein the strip-shaped handle part is wound around the body of the drinking water bottle in conformity with the circumferential contour of the body of the drinking water bottle.

10. The handled drinking water bottle of claim 9, wherein the strip-shaped handle part is provided with a cushion member.

11. The handled drinking water bottle of claim 1, wherein the strip-shaped handle part is wound around the body of the drinking water bottle in conformity with the circumferential contour of the body of the drinking water bottle.

12. The handled drinking water bottle of claim 11, wherein the strip-shaped handle part is provided with a cushion member.

* * * * *